(12) United States Patent
Young

(10) Patent No.: US 8,777,178 B2
(45) Date of Patent: Jul. 15, 2014

(54) ADJUSTABLE VALVE ACUTATOR SYSTEM

(75) Inventor: Terry Glenn Young, Longview, TX (US)

(73) Assignee: Array Holdings, Inc., Houston, TX (US)

( * ) Notice: Subject to any disclaimer, the term of this patent is extended or adjusted under 35 U.S.C. 154(b) by 9 days.

(21) Appl. No.: 13/465,858

(22) Filed: May 7, 2012

(65) Prior Publication Data
US 2013/0291954 A1    Nov. 7, 2013

(51) Int. Cl.
*F16K 31/12* (2006.01)
(52) U.S. Cl.
USPC ................................ 251/60; 251/61; 251/61.4
(58) Field of Classification Search
USPC ........... 251/60, 61, 61.2, 61.4, 284, 285, 331, 251/335.2
See application file for complete search history.

(56) References Cited

U.S. PATENT DOCUMENTS

| | | | |
|---|---|---|---|
| 862,867 A * | 8/1907 | Eggleston ...................... 417/390 |
| 2,495,087 A * | 1/1950 | Berkholder ................ 137/636.1 |
| 2,892,608 A * | 6/1959 | Collins ........................ 251/61.4 |
| 3,608,912 A | 9/1971 | Templin |
| 3,648,718 A * | 3/1972 | Curran .......................... 137/269 |
| 3,896,835 A | 7/1975 | Wicke |
| RE29,322 E | 7/1977 | Nelson |
| 4,129,283 A | 12/1978 | Taylor |
| 4,135,547 A | 1/1979 | Akkerman et al. |
| 4,157,167 A | 6/1979 | Akkerman |
| 4,271,857 A | 6/1981 | Rowe |
| 4,372,333 A | 2/1983 | Goans |
| 4,568,058 A | 2/1986 | Shelton |
| 4,585,207 A | 4/1986 | Shelton |
| 4,682,757 A * | 7/1987 | Shelton ........................... 251/77 |
| 5,067,510 A | 11/1991 | Breaux et al. |
| 6,015,134 A * | 1/2000 | Johnson ....................... 251/61.4 |
| 8,210,501 B2 * | 7/2012 | Lee ............................... 251/354 |
| 2004/0155210 A1 * | 8/2004 | Wears et al. .................... 251/12 |

OTHER PUBLICATIONS

Axelson, "Manumatic" Diaphragm Gate Valve Actuator, (dated 1985 according to opposing counsel in pending litigation).
W-K-M Surface Safety System; Cooper Industries; Flow Control; Catalog S, Issue 5, Copyright 1989; (pp. 1-24).
LCR Actuator; Operating Manual for Cameron LC ROCS-1 Actuators Which Meet ANSI/ASME SPPE-1 and API Specification 14D Requirements; Cameron Iron Works, Inc.; SD-1627; Mar. 1971; (pp. 1-21).
Description of Cameron Type "A" Fail-Safe Valve; Cooper Iron Works, Inc., Engineering Bulleting No. 170; Dec. 5, 1969; (pp. 1-7).
Baker CAC, Inc.; Bonnet Assembly; Unite No. 880-66-7341; Jun. 15, 1999; (pp. 1).
McEvoy-Willis; Surface Safety Valve (SSV) Hydraulic Actuator; Catalog No. 103-A; Feb. 1987; (pp. 8).
Cameron Oil Tool Division; Gate Valves; Cameron Iron Works, Inc. 1997; (pp. 7).
Cameron Iron Works, Inc.; LCR and HLCR Actuators and Accessories, 1986-1987 General Catalog; (pp. 2).

(Continued)

*Primary Examiner* — John K Fristoe, Jr.
*Assistant Examiner* — Umashankar Venkatesan

(57) ABSTRACT

A valve actuator apparatus and method for adjusting for valve bore drift using an adjustable downstop is disclosed. The adjustable downstop comprises a downstop and a drift adjuster. The drift adjuster can me moved in an upwards or downwards direction to increase or decrease the stroke length of the operator shaft.

20 Claims, 2 Drawing Sheets

(56) References Cited

OTHER PUBLICATIONS

Cameron Iron Works, Inc.; Cameron Automatic Safety Valves; Cameron Oil Products 1972-1973; (pp. 3).

Gray Tool Company; Graysafe(TM) Hydraulic and Pneumatic Actuators, (Apr. 1981) 10m 10/820.

Axelson Incorporated; Condensed Catalog, (pp. ICC 0001417-ICC-0001442); pre 1982.

* cited by examiner

ADJUSTABLE VALVE ACUTATOR SYSTEM

FIELD

The present invention relates generally to valve actuators. More particularly the present invention relates to a valve actuator having improved adjustment ability in order to compensate for valve drift.

BACKGROUND

A valve is a device that regulates the flow of a substance. Valves are produced in a variety of different styles, shapes and sizes. Typically, valves are used for gases and liquids. However, valves are also used on solids capable of flow, slurries or any other substance capable of flow. Valves are used in almost every industry having a substance that flows.

One type of valve is a gate valve, also referred to as a sluice valve. A gate valve opens by moving a blocking element from the path of flow. The blocking element may be a round disk, a rectangular element, or a wedge. Gate valves have a blocking element and a seat forming a substantially leak proof seal. In a gate valve, the blocking element can be referred to as a gate valve block, a gate block or a block. In the open position, a gate valve has a bore where the substance is allowed to partially or completely flow through the valve. In a gate valve, the bore may be referred to a gate valve bore. When the gate valve bore is across the valve bore the gate valve is in an open position. When the gate valve block is across the valve bore, the gate valve is in a closed position.

Gate valves may be operated manually or automatically. One method to automatically operate a gate valve is to use an actuator. An actuator is a mechanical device for moving or controlling a mechanism or system. When an actuator is used in a gate valve, the actuator is typically linked to a stem to repeatedly move the valve gate between open and closed positions.

Actuators to open and close the gate valves may include manual operators, diaphragm-type operators, pneumatic operators and hydraulic operators. Often, a manual operator is combined with a manual operator with a diaphragm-type, pneumatic or hydraulic operator for back-up and test purposes. Additionally, the actuator may include a bonnet assembly, which interconnects the valve body and the valve gate, and a bonnet stem which is movable with the gate via an operator.

A manual operator is often seen combined with diaphragm or hydraulic operator for back up purposes. These combinations generally result in a top shaft extending from the operator. The extension of the top shaft may indicate whether the valve is open or closed.

It is often desirable to be able to change the actuator without changing the bonnet assembly. This may prove difficult in implementation however, because changes in the actuator may require changes in upstop and downstop adjustments in order to ensure that the gate is positioned correctly when open and when closed. Additionally, drift shims have been traditionally employed to help adjust drift. However, the use of drift shims may require additional disassembly of the actuator for the installation.

While movement of the actuator housing against the bonnet may provide some advantages in correcting for valve drift, it may be desirable to have some actuator adjustment which is less prone to unwanted movement when the actuator is placed on a Christmas tree or other structure.

An additional adjustment device on a valve actuator located within the actuator housing or improved positioning and securement of a diaphragm may be desirable to overcome these obstacles.

SUMMARY

Certain embodiments of the invention pertain to an actuator for moving a valve gate between open and closed valve positions within a valve body, the actuator comprising: an actuator housing comprising a pressurizeable chamber with an inlet port and an unpressurized chamber, the actuator housing having a distal end and a proximal end; a plate positioned within the actuator housing and with a proximal side and distal side positioned between the pressurized and unpressurized chambers; a downstop having a proximal side and distal side, the distal side abutting the proximal side of the plate and the proximal side having a protrusion adapted to receive a drift adjuster, the drift adjuster at least partially surrounding the protrusion and the drift adjuster having a proximal end and distal end; an operator shaft having a proximal end and distal end, the distal end affixed within the a bore located on the proximal side of the downstop, the operator shaft further defining a shaft axis; a bonnet in connection with the proximal end of the actuator housing; the bonnet having an internal bore adapted to receive a packing retainer having a proximal and distal end, the packing retainer being affixed to the internal bore of the bonnet; and wherein the drift adjuster and the packing retainer are along the shaft axis and there is a distance between the proximal end of the drift adjuster and the distal end of the packing retainer when the pressurizeable chamber is unpressurized, and wherein the distance may be increased or decreased by movement of the drift adjuster in a longitudinal direction relative to the downstop.

In further embodiments of the invention the downstop has external threading and the drift adjuster has internal threading adapted to receive the downstop.

Still further, in certain embodiments of the invention regarding the plate, the plate is centered with respect to the downstop via a partial bore on the proximal side adapted to receive a downstop peg positioned at the distal end of the downstop.

Regarding access to the drift adjuster, in certain embodiments, the lower actuator housing has external access holes for move the drift adjuster. Preferably a long tool such as a screwdriver is used to move the drift adjuster.

In certain embodiments of the invention the actuator is a piston actuator and the plate is a piston.

In certain embodiments of the invention the actuator is a diaphragm actuator and the plate is a diaphragm retainer plate. In such embodiments, the actuator further comprises a diaphragm having a proximal side and distal side spaced between the top actuator housing and the lower actuator housing, the proximal side of the diaphragm abutting the distal side of the diaphragm retainer plate.

Certain further embodiments of the invention comprise the actuator having a top shaft with a flange at the proximal end of the top shaft, wherein the top shaft is secured to the diaphragm retainer plate by a diaphragm retainer nut, a diaphragm retainer plate nut, a retainer ring or a combination thereof.

In embodiments of the invention related to adjustment of the drift adjuster, the actuator may have one or more perpendicular bores threaded to receive drift adjuster screws. Further pertaining to the drift adjuster screws, in certain embodiments, tightening the screws prevents movement of the drift adjuster relative to the downstop.

In further embodiments of the invention pertaining to the packing retainer, the packing retainer further comprises an internal bore to receive the operator shaft. In such embodiments related to the operator shaft, the downstop may be threaded internally and adapted to receive a threaded portion of the operator shaft, such that the operator shaft is affixed to the downstop.

Other embodiments of the invention pertain to a method of compensating for valve drift within an actuator, having a distal end oriented away from a valve and a proximal end oriented toward a valve, the method comprising obtaining an actuator with: a top and lower actuator housing and a plate separating the top and lower housing, the top housing further comprising a pressurizable chamber; a downstop with a proximal end and distal end positioned proximal to the plate, the downstop adapted to receive a drift adjuster near the proximal end of the downstop, the drift adjuster having an internal bore and a proximal and distal end; a bonnet in connection with the lower actuator housing, the bonnet having an internal bore adapted to receive a packing retainer; the packing retainer positioned within the internal bore of the bonnet, and the packing retainer having a proximal end and distal end and an internal bore adapted to receive an operator shaft, the operator shaft defining a shaft axis; wherein the drift adjuster and the packing retainer are along the shaft axis and there is a distance between the proximal end of the drift adjuster and the distal end of the packing retainer; and moving the drift adjuster in a proximal direction or distal direction such that the distance between the proximal end of the drift adjuster and the distal end of the drift adjuster increases or decreases.

In such embodiments, the downstop is threaded and the internal bore of the drift adjuster may be threaded such that the threaded regions receive each other. In still further embodiments related to a threaded downstop, rotation of the drift adjuster in a clockwise or counterclockwise direction increases or decreases the distance between the drift adjuster and the packing retainer.

In further embodiments, upon increasing or decreasing the distance between the proximal end of the drift adjuster and the distal end of the packing retainer, movement of the drift adjuster is prevented by tightening one or more drift adjuster screws, each drift adjuster screw being screwed into a threaded drift adjuster screw bore positioned from an external surface of the drift adjuster through the threaded drift adjuster screw bore of the drift adjuster.

In still further embodiments an operator shaft may be inserted through the proximal end of the packing retainer, and through the internal bore of the packing retainer and into a threaded downstop partial bore adapted to receive a threaded distal end of the operator shaft.

In embodiments concerning the method, increasing the distance between the drift adjuster and the packing retainer results in increasing a longitudinal movement of the operator shaft upon pressurization of the top housing. Likewise, decreasing the distance between the drift adjuster and the packing retainer results in decreasing the longitudinal movement of the operator shaft upon pressurization of the top housing. In such embodiments, the drift adjuster is adjusted by inserting an elongated tool through an external access port on the lower actuator housing and rotating the drift adjuster with the tool.

Figure 1:
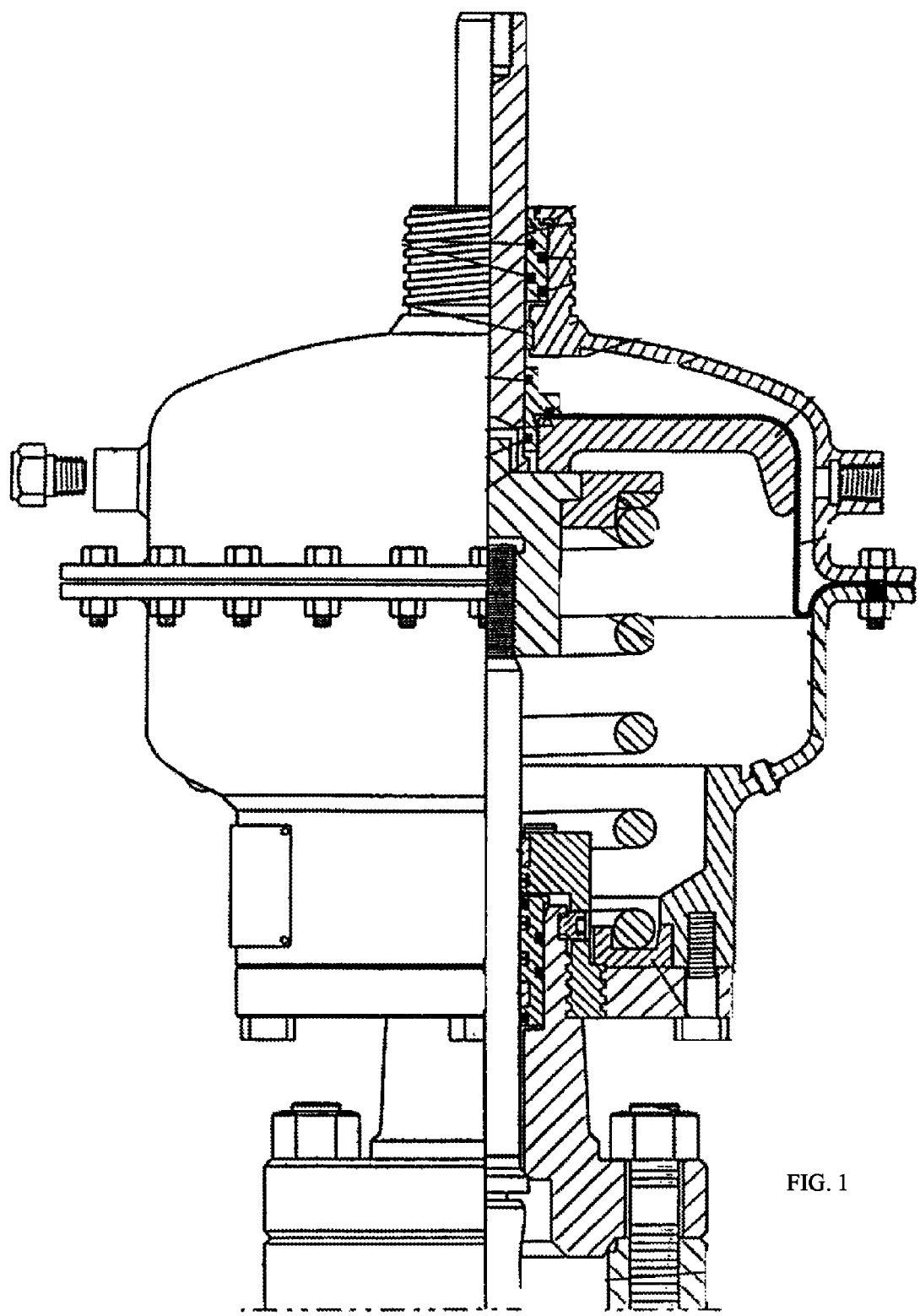
FIG. 1 is an illustration of a prior art diaphragm type actuator.

LIST OF REFERENCE NUMERALS 10 diaphragm actuator
20 top actuator housing
30 lower actuator housing
40 actuator bolts
50 inlet port
53 exit port
70 upper plug
73 internal bore
80 top shaft
83 diaphragm
85 top shaft flange
90 seal retainer
100 seal
110 top shaft seal
120 wear bearings
130 diaphragm retainer nut
134 diaphragm retainer plate nut
136 diaphragm retainer plate bore
138 retainer ring
190 diaphragm retainer plate
191 downstop peg
192 downstop
193 exterior threading
194 downstop partial bore
195 downstop interior threading
196 external access ports
202 drift adjuster
203 drift adjuster screws
204 spring retainer plate
220 bonnet ring
230 threaded holes
240 bolts
250 bonnet
260 packing retainer
280 operator shaft o ring
290 packing retainer o ring
320 operator shaft shoulder
330 operator shaft screw

DETAILED DESCRIPTION

Introduction

The embodiments of the invention relate to actuators. While an exemplary embodiment of the invention relates to diaphragm actuators, a method to adjust a downstop in relation to a packing retainer is applicable and intended to encompass hydraulic actuators, piston actuators, and pneumatic actuators as well. The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings making apparent to those skilled in the art how the several forms of the invention may be embodied in practice.

Valve actuators, are well known in the art. U.S. Pat. Nos. 7,028,986; 6,854,704; and 6,450,477 are examples of typical diaphragm type valve actuators. U.S. Pat. No. 4,967,785 is an example of a hydraulic type actuator. U.S. Pat. No. 4,783,046 is an example of a pneumatic type actuator. Examples of the prior art related to pneumatic or piston type actuators can be found in FIG. 1.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

Distal, in certain instances, can be defined as toward the top of the actuator and away from any valve on which the actuator rests.

Proximal, in certain instances, can be defined as toward a valve on which an actuator is mounted and away from the top of the actuator.

Figure 2:
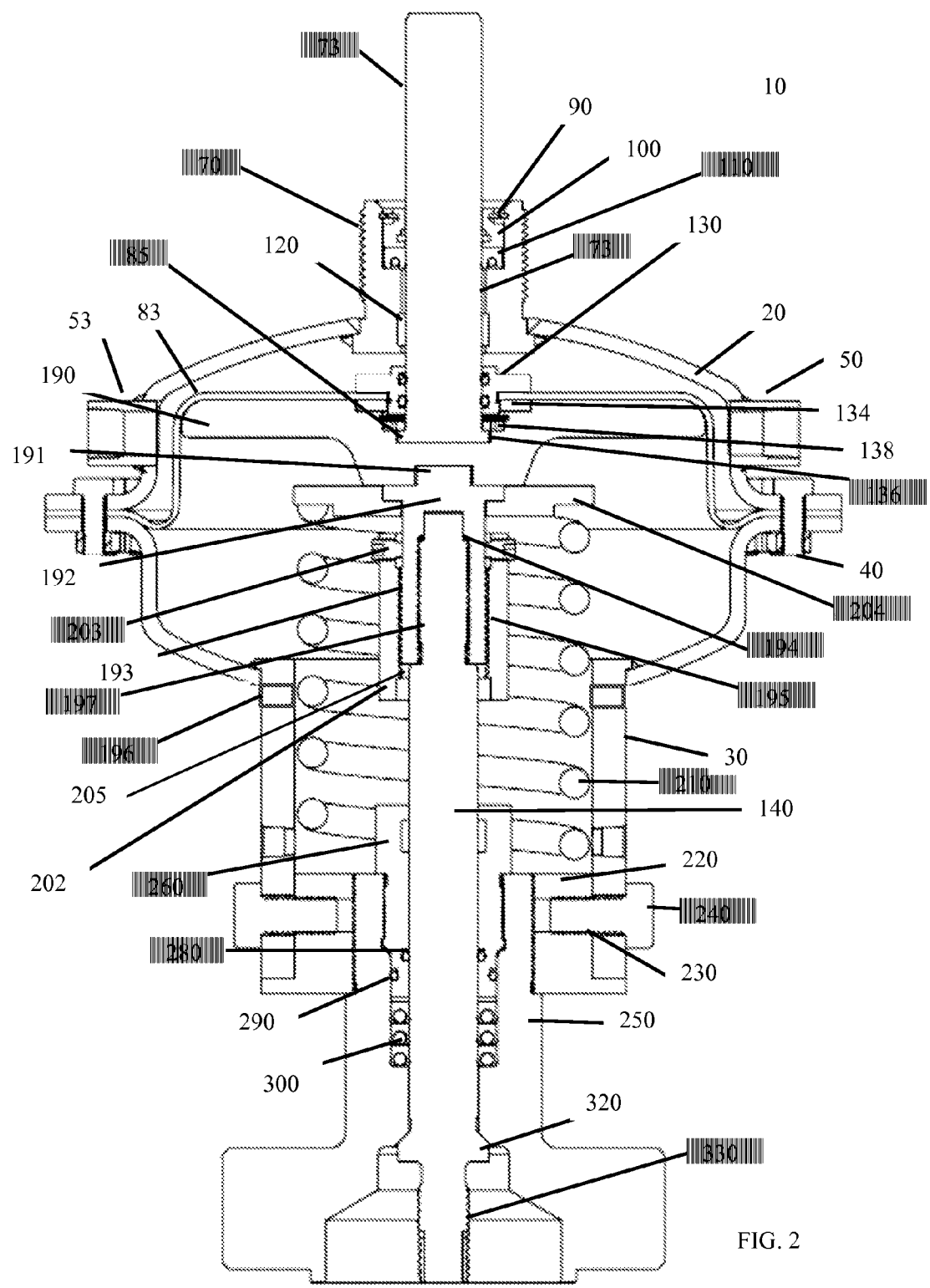
FIG. 2 is an illustration of a cross section of a diaphragm-type valve actuator in accord with the present invention.

Referring now to the drawings, and more particularly to FIG. 2, a diaphragm actuator 10 is shown in the present invention. For the purposes of this description, the term distal may refer to a direction away from a valve and may refer to a direction toward a valve.

Referring to FIG. 2, the actuator has a top actuator housing 20 and a lower actuator housing 30. The top actuator housing is distal to the lower actuator housing and is bolted to the distal end of the lower actuator housing via a series of actuator bolts 40.

Further in FIG. 2, the top actuator housing 20 has an inlet port for increasing or decreasing pressure hereafter referred to as an inlet port 50. Likewise, the top actuator housing 20 has an exit port 53, which may be fitted with a pressure release valve.

The distal end of the top actuator housing 20 possesses an upper plug 70 which is welded, cast, forged or screwed into the top actuator housing. The upper plug 70 has an internal bore 73 for receiving a top shaft 80. Between the inner bore of the upper plug and the top shaft is a seal retainer 90, preferably made of a hard substance such as stainless steel. Proximal to the seal retainer 90 is at least one seal 100. Proximal to the seal retainer and seal is a top shaft seal 110 which may comprise Polypack™. Proximal to the top shaft seal are wear bearings 120 which at least partially surround the top shaft 80. The seal retainer 90, the seal 100 and the wear bearings 120 are preferably non-metallic to eliminate close tolerance problems which may be associated with the actuator top shaft. These components may be made of hard plastic like materials such as delrin, nylon, thermoplastics, resins, polyurethanes, phenolics, acetals, polyacrylates, epoxies, polycarbonates, polyester, aramids and the like.

As further illustrated in FIG. 2, the upper plug 70, through which the top shaft 80 fits, is at the distal end of the top actuator housing 20. With positional reference to the diaphragm 83, the top shaft 80 has a proximal end pointed away from the diaphragm and a distal end pointed towards the diaphragm. While it is contemplated that the top shaft 80 may be made of any rigid material, the top shaft 80 is preferably formed from stainless steel. Additionally, it is preferable, that the top shaft is large enough in diameter to prevent bucking stresses when loaded by a manual override or a hydraulic override. The proximal end of the top shaft passes through the diaphragm retainer nut 130 and interacts with the diaphragm retainer plate 190.

More particularly illustrated in FIG. 2, the proximal end of the top shaft 80 possesses a flange 85. The diaphragm retainer nut 130 has external threading near its proximal end which and threads into a diaphragm retainer plate nut 134, which is at the distal end of the partial diaphragm retainer plate bore 136. Still further, to secure the top shaft flange 85, a retainer ring 138 is employed which rests distal to the top shaft flange 85.

The proximal side of the diaphragm retainer plate 190 has an indentation which is adapted to receive the downstop peg 191 which is at the distal end of the downstop 192.

Referring further to the downstop 192 as depicted in FIG. 2, the downstop possesses exterior threading 193 and a downstop partial bore 194 with downstop interior threading 195 adapted to receive an operator shaft with an external threaded region 197.

Surrounding the exterior of the downstop 192 is a drift adjuster 202. A downstop assembly may comprise the downstop 192 and the drift adjuster 202. The drift adjuster 202 has a drift adjuster internal bore 205, which, in this particular embodiment is threaded and adapted to receive the downstop 192 via the downstop exterior threading 193. However, it is contemplated that in some embodiments, a threaded connection is not present.

Further, the downstop 192 can be considered to have a distal portion abutting the diaphragm retainer plate 190 and a proximal end in the shape of a protrusion extending from the distal portion of the downstop. In this manner, the drift adjuster may associate with the protrusion area of the downstop. The drift adjuster may further comprise one or more threaded bores from the external side of the drift adjuster to the drift adjuster internal bore 205 and which are adapted to receive one or more drift adjuster screws 203 to prevent rotation of the drift adjuster with respect to the downstop once the desired adjustment has taken place. In order to adjust the drift adjuster, external access ports 196 are spaced annularly around the lower actuator housing. A tool, such as a screw driver or similar long instruments can be inserted through the external access ports to adjust the drift adjuster 202.

The benefit of having an internal adjustable downstop is the ease of measurement, the adjustment of the stroke or travel of the actuator can be adjusted externally using common tools. Direct labor time and injury to components is reduced. In general, diaphragm actuators adjust the stroke using shims or spacers placed proximally to the downstop or distally to the packing retainer. However, such spacers and shims have a specific width. With the close tolerances required in valve adjustment, the ability to move a drift adjuster to any functional width is advantageous.

Surrounding the upper portion of the downstop 192 is the spring retainer plate 204. The proximal side of the upper spring retainer plate abuts the distal portion of the central spring 210. The central spring 210 surrounds the drift adjuster 202, the downstop, 192 and the operator shaft 140 as depicted in FIG. 2. The proximal end of the central spring abuts the bonnet ring 220.

In other aspects of FIG. 2, the external circumference of the bonnet ring abuts the lower actuator housing 20. The internal bore of the bonnet ring 220 is threaded. Preferably, to secure the bonnet ring 220 to the lower actuator housing 20, the bonnet ring 220 may have a series of threaded holes 230 of a defined circumference which are perpendicular to the operator shaft 140. Likewise, the lower actuator housing 20 may have a series of holes which are approximately the same circumference as the threaded holes 230 of the bonnet ring 220 and which are capable of aligning with the threaded holes 230 of the bonnet ring. Bolts 240 may be screwed into the threaded holes from the exterior of the lower actuator housing such that the lower actuator housing abuts the bonnet ring. Preferably the interface of the lower actuator housing with the bonnet ring is air tight. As further illustrated in FIG. 2, the bolts 240 are positioned in a horizontal or latitudinal direction relative to the top shaft 80. By orienting the bolts in a horizontal position, the lower actuator housing does not need to be as thick to accommodate threaded bolt holes. Thus, the advantage of horizontal positioning of bolts 240 is a decrease in the weight of the actuator housing, which can aid in transportation and installation.

As indicated previously, the internal bore of the bonnet ring 220 is threaded. Threaded into the bonnet ring is the bonnet 250. Thus the actuator housing can be screwed onto the bonnet 250 via the bonnet ring 220. The tension on the central spring 210 can also be adjusted by rotating the actuator housing with respect to the bonnet. As illustrated in FIG. 2, the bonnet 250 comprises an internal bore. The distal portion of the internal bore is threaded so as to receive the packing retainer 260. The packing retainer 260 preferably surrounds the operator shaft 140.

Distal to the packing retainer 260 are two o rings. O rings are preferably Viton® O rings. The operator shaft o ring 280 surrounds the operator shaft 140 and is between the packing retainer 260 and the operator shaft 140. The packing retainer o ring 290 surrounds the packing retainer and is in between the packing retainer and the bonnet as illustrated in FIG. 2.

Proximal to the packing retainer and within the bore of the bonnet are operator seals 300. Preferably the operator seals are Polypack™ seals.

At the proximal end of the bonnet as depicted in FIG. 2, the operator shaft possesses an operator shaft shoulder 320 preventing upward or distal movement of the operator shaft. Proximal to the operator shaft shoulder 320 is an operator shaft screw 330.

The foregoing detailed disclosure and description of the invention is illustrative and explanatory thereof, and it will be appreciated by those skilled in the art, that various changes in the size, shape and materials as well as in the details of the illustrated construction, reliability configurations, or combination of features of the various valve actuator elements of the present invention may be made without departing from the spirit of the invention.

The invention claimed is:

1. An actuator for moving a valve gate between open and closed valve positions within a valve body, the actuator comprising:
   a. an actuator housing comprising a pressurizeable chamber with an inlet port and an unpressurized chamber, the actuator housing having a distal end and a proximal end;
   b. a plate positioned within the actuator housing and with a proximal side and distal side positioned between the pressurized and unpressurized chambers;
   c. a downstop having a proximal side and distal side, the distal side abutting the proximal side of the plate and the proximal side having a protrusion adapted to receive a drift adjuster, the drift adjuster at least partially surrounding the protrusion and the drift adjuster having a proximal and distal end;
   d. an operator shaft having a proximal end and distal end, the distal end affixed within the a bore located on the proximal side of the downstop, the operator shaft further defining a shaft axis;
   g. a bonnet in connection with the proximal end of the actuator housing; the bonnet having an internal bore adapted to receive a packing retainer having a proximal and distal end, the packing retainer being affixed to the internal bore of the bonnet; and
wherein the drift adjuster and the packing retainer are along the shaft axis and there is a distance between the proximal end of the drift adjuster and the distal end of the packing retainer when the pressurizeable chamber is unpressurized, and wherein the distance may be increased or decreased by movement of the drift adjuster in a longitudinal direction relative to the downstop.

2. The actuator of claim 1, wherein the downstop has external threading and the drift adjuster has internal threading adapted to receive the downstop.

3. The actuator of claim 1, wherein the plate is centered with respect to the downstop via a partial bore on the proximal side adapted to receive a downstop peg positioned at the distal end of the downstop.

4. The actuator of claim 1, wherein the lower actuator housing has external access holes for moving the drift adjuster.

5. The actuator of claim 1, wherein the actuator is a piston actuator and the plate is a piston.

6. The actuator of claim 1, wherein the actuator is a diaphragm actuator and the plate is a diaphragm retainer plate.

7. The actuator of claim 6, wherein the actuator further comprises a diaphragm having a proximal side and distal side spaced between the top actuator housing and the lower actuator housing, the proximal side of the diaphragm abutting the distal side of the diaphragm retainer plate.

8. The actuator of claim 7, further comprising a top shaft with a flange at the proximal end of the top shaft, wherein the top shaft is secured to the diaphragm retainer plate by a diaphragm retainer nut, a diaphragm retainer plate nut, a retainer ring or a combination thereof.

9. The actuator of claim 1, wherein the drift adjuster has one or more perpendicular bores threaded to receive drift adjuster screws.

10. The actuator of claim 9, wherein tightening the screws prevents movement of the drift adjuster relative to the downstop.

11. The actuator of claim 1, wherein the packing retainer further comprises an internal bore to receive the operator shaft.

12. The actuator of claim 1, wherein the downstop is threaded internally and is adapted to receive a threaded portion of the operator shaft.

13. A method of compensating for valve drift within an actuator, having a distal end oriented away from a valve and a proximal end oriented towards a valve, the method comprising:
   obtaining an actuator with:
   a. a top and lower actuator housing and a plate separating the top and lower housing, the top housing further comprising a pressurizable chamber;
   b. a downstop with a proximal end and distal end positioned proximal to the plate, the downstop the downstop adapted to receive a drift adjuster near the proximal end of the downstop, the drift adjuster having an internal bore and a proximal end and distal end;
   c. a bonnet in connection with the lower actuator housing, the bonnet having an internal bore adapted to receive a packing retainer;
   d. a packing retainer positioned within the internal bore of the bonnet, the packing retainer having a proximal end and distal end and an internal bore adapted to receive an operator shaft, the operator shaft defining a shaft axis;
      wherein the drift adjuster and the packing retainer are along the shaft axis and there is a distance between the proximal end of the drift adjuster and the distal end of the packing retainer; and moving the drift adjuster in a proximal or distal direction such that the distance between the proximal end of the drift adjuster and the distal end of the drift adjuster increases or decreases.

14. The method of claim 13, wherein the downstop is threaded and the internal bore of the drift adjuster is threaded such that the threaded regions receive each other.

15. The method of claim 14, wherein rotation of the drift adjuster in a clockwise or counterclockwise direction increases or decreases the distance between the drift adjuster and the packing retainer.

16. The method of claim 13, wherein upon increasing or decreasing the distance between the proximal end of the drift adjuster and the distal end of the packing retainer, movement of the drift adjuster is prevented by tightening one or more drift adjuster screws, each drift adjuster screw being screwed into a threaded drift adjuster screw bore positioned from an external surface of the drift adjuster through the threaded drift adjuster screw bore of the drift adjuster.

17. The method of claim 13, wherein an operator shaft is inserted through the proximal end of the packing retainer and through the internal bore of the packing retainer and into a threaded downstop partial bore adapted to receive a threaded distal end of the operator shaft.

18. The method of claim 13, wherein increasing the distance between the drift adjuster and the packing retainer results in increasing a longitudinal movement of the operator shaft upon pressurization of the top housing.

19. The method of claim 13, wherein decreasing the distance between the drift adjuster and the packing retainer results in decreasing the longitudinal movement of the operator shaft upon pressurization of the top housing.

20. The method of claim 13, further comprising inserting an elongated tool through an external access port on the lower actuator housing and rotating the drift adjuster with the tool.

* * * * *